United States Patent
Wojsznis et al.

(10) Patent No.: US 6,577,908 B1
(45) Date of Patent: Jun. 10, 2003

(54) ADAPTIVE FEEDBACK/FEEDFORWARD PID CONTROLLER

(75) Inventors: Wilhelm K. Wojsznis, Round Rock, TX (US); Terrence L. Blevins, Round Rock, TX (US)

(73) Assignee: Fisher Rosemount Systems, Inc, Austin, TX (US)

( * ) Notice: Subject to any disclaimer, the term of this patent is extended or adjusted under 35 U.S.C. 154(b) by 349 days.

(21) Appl. No.: 09/597,611

(22) Filed: Jun. 20, 2000

(51) Int. Cl.[7] ............................................... G05B 13/02
(52) U.S. Cl. .............................. 700/42; 700/28; 700/31; 700/52; 318/561; 318/610
(58) Field of Search ............................. 700/28–31, 37, 700/42, 44–45, 52, 54, 71, 41, 43; 318/610, 561

(56) References Cited

U.S. PATENT DOCUMENTS

| | | | |
|---|---|---|---|
| 4,641,235 A | 2/1987 | Shigemasa et al. | 364/149 |
| 5,018,215 A | * 5/1991 | Nasr et al. | 382/155 |
| 5,159,547 A | 10/1992 | Chand | 364/157 |
| 5,180,896 A | 1/1993 | Gibby et al. | 219/10.55 |
| 5,272,621 A | 12/1993 | Aoki | 364/165 |
| 5,335,164 A | 8/1994 | Gough, Jr. et al. | 364/149 |
| 5,453,925 A | 9/1995 | Wojsznis et al. | 364/157 |
| 5,461,559 A | * 10/1995 | Heyob et al. | 700/29 |
| 5,568,378 A | 10/1996 | Wojsznis | 364/164 |
| 5,587,899 A | 12/1996 | Ho et al. | 364/157 |
| 5,625,552 A | * 4/1997 | Mathur et al. | 700/42 |
| 5,748,467 A | 5/1998 | Qin et al. | 364/148 |
| 6,041,320 A | 3/2000 | Qin et al. | 706/1 |
| 6,049,738 A | 4/2000 | Kayama et al. | 700/29 |
| 6,249,712 B1 | * 6/2001 | Boiquaye | 700/31 |

FOREIGN PATENT DOCUMENTS

| | | | |
|---|---|---|---|
| WO | WO 97/12300 | 4/1997 | G05B/13/02 |
| WO | WO 00/33209 | 6/2000 | G06F/17/00 |

OTHER PUBLICATIONS

Hanagud, S., Glass, B.J., and Calise, A.J., "Artificial Intelligence–Based Model–Adaptive Approach to Flexible Structure Control", American Institute of Aeronautics and Astronautics, Inc., vol. 13, No. 3 pp. 534–544 (May 1990).

International Search Report in PCT/US 01/19706 dated Oct. 12, 2001.

* cited by examiner

Primary Examiner—John A. Follansbee
Assistant Examiner—Ronald D Hartman, Jr.
(74) Attorney, Agent, or Firm—Marshall, Gerstein & Borun

(57) ABSTRACT

A system and method for adaptively designing self-tuning controllers, specifically PID controllers for process control systems. The method is based on a model-parameter interpolation, according to which a candidate process model is defined by a predetermined, limited set of models. Each of the models is characterized by a plurality of parameters, and, for each model, each of the parameters has a respective value that is selected from a set of predetermined initialization values corresponding to the parameter. Evaluation of each of the models includes computation of a model squared error and computation of a Norm that is derived from the model square errors calculated for the models. The Norm value is assigned to every parameter value represented in the model that is represented in an evaluation scan. As repeated evaluations of models are conducted, an accumulated Norm is calculated for each parameter value. The accumulated Norm is the sum of all Norms that have been assigned to the parameter value in the course of model evaluations. Subsequently, an adaptive parameter value is calculated for each parameter. The adaptive parameter value is a weighted average of the initialization values assigned to the respect parameters. The set of adaptive process parameter values are then used to redesign a process controller.

22 Claims, 2 Drawing Sheets

ADAPTIVE FEEDBACK/FEEDFORWARD PID CONTROLLER

BACKGROUND OF THE INVENTION

1. Field of the Invention

The invention relates to process control techniques and, more particularly, to an adaptive PID (Proportional, Integral and Derivative) controller that is characterized by parameter values derived from an interpolation of process model parameters.

2. Description of the Related Art

Logic-based, controller-switching strategies have been proposed as a potential approach to the implementation of adaptive process control. See, for example, Morse, F. M. Pait, and S. R. Weller, "Logic-Based Switching Strategies for Self-Adjusting Control, 33$^{rd}$ IEEE Conference on Decision and Control (December 1994). In general, logic-based controller-switching strategies may be categorized into one of two approaches.

The first approach is predicated on prerouted controller tuning. In principle, prerouted tuning involves sequential evaluation of candidate controllers that are drawn from a prescribed set. The evaluation is complete when a controller is identified that performs satisfactorily. Prerouted tuners are relatively simple to design and impose few requirements on controller structure. However, the advantages of prerouted tuners are overshadowed by intrinsically poor performance with respect to tuning time. That is, an inordinate length of time is often required to select the optimal controller from the prescribed set.

An alternative approach is based on an identifier-based, parameterized controller that consists of two parameter-dependent subsystems, an identifier, the primary function of which is to generate an output estimation error, and an internal controller. The control signal that is fed back to the process is based on a current estimate of the process model. In general, the estimates of the process model are selected from a suitably defined model set. The overall strategy is based on the concept of "cyclic switching." Cyclic switching can be employed with or without process excitation. A worthwhile review and evaluation of this approach to process control adaptation is given by K. S. Narendra and J. Balakrishnan in "Adaptive Control Using Multiple Models," *IEEE Transactions on Automatic Control*, Vol. 42, No. 2, pp. 177–187 (February 1997). That article discloses an architecture with N identification models operating in parallel. Corresponding to each model is a parameterized controller. At any point in time, one of the models is selected by a switching rule, and the corresponding control input is used to control the process. Models may be fixed or adaptive. The rationale for using fixed models is to ensure that there exists at least one model characterized by parameters sufficiently close to those of the unknown process. The approach yields the desired speed of adaptation, but requires that a significant number of models be constructed. In addition, because fixed models are capable of precisely representing only a finite number of environments, adaptive models must be used to asymptotically improve accuracy.

The practical application of switching strategies poses a number of problems, largely due to the number of models required for a reasonable process approximation. Even in a simple single-input, single-output (SISO) system, a self-tuner can reasonably be expected to necessitate hundreds of fixed models in order to achieve satisfactory performance. The requirement for numerous process models exacerbates exponentially in multivariable systems. More effective solutions require consideration of the specific process model structure and controller type, and suggest the replacement of a simple switching strategy with more elaborate procedures.

A significantly modified approach has been offered by Gendron for a Dahlin controller. See, S. Gendron, "Improving the Robustness of Dead-Time Compensators for Plants with Unknown of Varying Delay," *Control Systems 90 Conference* (Helsinki 1990). Gendron therein describes a simple first-order-plus-dead-time process model, according to which process adaptation is effected exclusively through dead time variation. Rather than relying on simple switching, the controller assumes a process model that is derived a weighted sum of models that are characterized by disparate dead times. Each model in the set generates a prediction of the process output, and the corresponding weight is adjusted automatically as a simple function of the prediction error. The concept has been extended to incorporate into a Dahlin controller both process gain and dead time uncertainty in the Dahlin controller construct.

In general, there exist two prominent approaches for designing a PID adaptive controller. To wit: the direct approach, and the indirect, or identifier-based, approach. As has been indicated above, because the identifier-based approach is advantageous for switching strategies, the subject invention generally pursues this approach for the design of an adaptive switching PID controller. Because there appears to be no art related to the switching of PID controllers, the present invention is deemed most nearly related to the classical identifier-based, adaptive PID controller. The result is an adaptive PID controller, coupled with a Recursive Least Squares (RLS) estimator, that tracks changes in the model parameters. Typical problems associated with recursive identifiers are known to include the selection of initial parameters, insufficient excitation, filtering, parameters wind-up, and sluggish parameter tracking speed. It is known that performance improvements may be obtained by simplifying the process model. A worthwhile example of this solution is given by Astrom and Hagglund in "Industrial Adaptive Controllers Based on Frequency Response Techniques," *Automatica*, Vol. 27, No. 4, pp. 599–609 (1991). The controller described therein is designed to perform adaptation in the frequency domain, and performs tuning in response to setpoint changes and natural disturbances. A specific tuning frequency is selected by applying band-pass filters to the process input and output. The frequency of the filters is set by the auto-tuner (tuner-on-demand). The auto-tuner defines the ultimate period using a relay oscillation technique, prior to adaptive tuner operation. The adaptive tuner defines the process gain for the tuning frequency using a simplified RLS estimator. The tuner has the capability to easily track changes in a process gain. However, when a change in a dead time or in a time constant is encountered, the point tracked no longer exhibits a $-\pi$ phase, and controller tuning becomes inaccurate. It is known that tuning can be improved significantly by applying several tuning frequencies and by using an interpolator to define a frequency with phase $-\pi$. Alternatively, it is possible to instantly operate with only one tuning frequency and adjust that frequency after each tuning cycle to track a phase $-\pi$. Both designs accommodate subsequent set point changes and natural disturbances and may inject external excitations at the controller output or at the setpoint input. Although such tuners do not exhibit the constraints of the previous technique, they are significantly more complex.

A more serious detriment of both designs is the reliance on a relatively primitive adaptive model that recognizes only two parameters: Ultimate Gain and Ultimate Period. A tuner model of this design is suitable for Ziegler-Nichols tuning or some cognate modifications, but will not satisfy the requirements of many applications where Internal Model Control (IMC) or Lambda tuning are preferred. A simple RLS identifier may be used to determine static gain for the feedforward control. However, that approach does not provide the process feedforward dynamics required for adequate feedforward control. In addition, because feedforward signals are load disturbances, and perturbation signals can not be injected as they may into the feedback path, the approach suffers the problem of insufficient excitations.

A more sophisticated solution to feedforward adaptation is disclosed in U.S. Pat. No. 5,043,863, "Multivariable Adaptive Feedforward Controller," to Bristol and Hansen. That patent describes a differential equation process model designed to include load disturbances. The model is periodically updated based on process data. Disturbances are characterized by moment relations and by control relations that are achieved by projection methods. In general, the solution is very complex and requires significant excitations, much the same RLS identification. The solution is suitable only for feedforward control and is inapplicable to an adaptive controller with feedback.

Accordingly, what is desired is an adaptive controller that surmounts the above-identified shortcomings that are exhibited by known approaches to adaptive control. Specifically, what is required is a uniform solution to feedback and feedforward adaptive PID control. Salient objectives addressed by the inventive Adaptive Feedback/Feedforward PID Controller include: shorter adaptation time, minimization of constraints imposed on the use of PID tuning rules, simplicity of design, and attainment of adaptation with reduction in process excitation.

SUMMARY OF THE INVENTION

The above and other objects, advantage and capabilities are realized in one aspect of the invention in a method of adaptively designing a controller in a process control system. According to the method, a set of models for the process is established. Each of the models is characterized by a plurality of parameters, and, for each model, each of the parameters has a respective value that is selected from a set of predetermined initialization values corresponding to the parameter. Evaluation of each of the models includes a computation of a model-squared error, or norm. The norm value is assigned to every parameter value represented in the model that is evaluated. As repeated evaluations of models are conducted, an accumulated norm is calculated for each parameter value. The accumulated norm is the sum of all norm that have been assigned to the parameter value in the course of model evaluations. Subsequently, an adaptive parameter value is calculated for each parameter. The adaptive parameter value is a weighted average of the initialization values assigned to the respective parameters. The controller is then redesigned in response to the adaptive parameter values.

Another aspect of the invention is embodied in a controller for use in controlling a process. The controller is characterized by controller parameters that are derived from adaptive process parameter values that are established according to the steps:

(i) establishing a set of models for the process, wherein each of the models is characterized by a plurality of parameters and, in each model, the value of each parameter is selected from a set of predetermined initialization values assigned to that parameter;

(ii) evaluating each of the models, whereby a model squared error, $E_i(t)$, is determined in the course of the evaluation of each of the models;

(iii) assigning a norm to each parameter value represented in an elevated model;

(iv) for each parameter, establishing an adaptive parameter value that is a weighted average of the values populating the set of initialization values assigned to the respective parameter; and (v) imparting adaptive controller parameter values to the controller, wherein the adaptive controller parameter values are derived from the adaptive process parameter values.

Another manifestation of the invention is comprehended by a system for tuning a process controller. The system may be implemented in either hardware software, or a combination thereof. The system comprises a models component having an input coupled to a process input. The models component comprises a plurality of process models, and each of the models is characterized by a plurality of parameters that have parameter values selected from a set of predetermined initialization values assigned to the respective parameter. An error generator has a first input coupled to an output of the models component and a second input coupled to the process output. The error generator generates a model error signal that represents the difference between the output of a model and the output of the process. A models evaluation component has an input coupled the an output of the error generator for computing a model squared error corresponding to a model for attributing the model squared error to parameter values represented in the model. A parameter interpolator has an input coupled to an output of the models evaluation component for calculating an adaptive process parameter value for parameters represented in a model. A controller redesign component has an input coupled to an output of the parameter interpolator and an output coupled to a controller. The controller redesign component imparts adaptive controller parameter values to a controller upon conclusion of an adaptation cycle. The adaptive controller parameter values are derived from the adaptive process parameter values that are calculated.

The invention is also embodied in an adaptive feedback/feedforward (FB/FC) controller that comprises a feedback controller (FBC) input node, and FBC output node, a process input node coupled to the FBC output node, a process output node coupled to the FBC input node, and an error node. An FBC is coupled between the FBC input node and the FBC output node. A models component has an input coupled to the process input node and comprises a plurality of controller models, wherein each of the models is characterized by a plurality of parameters. The parameters have values selected from sets of predetermined initialization values compiled for each of the parameters. An error generator has a first input coupled to an output of the models component and a second input coupled to the process output node. The error generator generates, at an error node, a model error signal that represents the instantaneous difference between the output of a model and the output of the process. A models evaluation has an input coupled to the error node and operates to compute a model squared error corresponding to a model. The model squared error is attributed to parameter values represented in a corresponding model. A parameter interpolator has an input coupled to an output of the models evaluation component for calculating adaptive parameter values to be associated with parameters represented in a model. A controller redesign component is coupled to the output of the parameter interpolator and imparts the adaptive parameter values to a controller upon conclusion of an adaptation cycle. Elements of the invention, including but not necessarily limited to, the models component, error generator, models evaluation component, parameter interpolator and controller redesign component, may be instantiated in hardware, software, and/ or an appropriate combination thereof. In a control system that incorporates feedforward as well as feedback control, the models component includes a plurality of feedforward controller (FFC) models as well as FBC models, and the parameters that characterize the FBC models may be different from the parameters that characterize the FFC models. Furthermore the parameter interpolator may be partitioned into a FFC parameter interpolator and a FBC parameter interpolator. Consequently, the controller redesign component will be similarly partitioned to impart FBC adaptive parameters and FFC adaptive parameters to the respective controllers.

The invention also contemplates circumstances according to which not all process parameters will be subject to adaptation in a given adaptation cycle. Limited adaptation is indicated when there is reason to believe that only one, or at least not all, the process parameters have changed. For example, it may be assumed that because of the amount of time elapsed since the most recent adaptation cycle, the process Gain parameter has drifted, while other process parameters remain substantially constant. Therefore, the process supervisor, described below, will initiate an adaptation cycle, but will cause only the process Gain parameter to be adapted. The process controller is then redesigned in response to the adapted process Gain parameter. Accordingly, the invention also inheres in a method of adaptive controller whereby, as above, a model set is compiled for the process, and each of the models is evaluated, that is, a corresponding model squared error is computed for each model. An adaptive (Gain) parameter value is calculated based on the weighted sum of each of the predetermined initialization parameter values. The initialization values are weighted by Normalized Fitness factors. With an adaptive process (Gain) parameter calculated, the controller is redesigned accordingly.

BRIEF DESCRIPTION OF THE DRAWINGS

The subject invention may be better understood, and its numerous objects, features and advantages made apparent to those skilled in the art by referencing the accompanying Drawings, and wherein:

FIG. 3 also depicts a suggested sequence in which to conduct a model scan.

DETAILED DESCRIPTION OF THE INVENTION

For a thorough understanding of the subject invention, reference is made to the following Detailed Description, including the appended Claims, in conjunction with the above-described Drawings.

Figure 1:
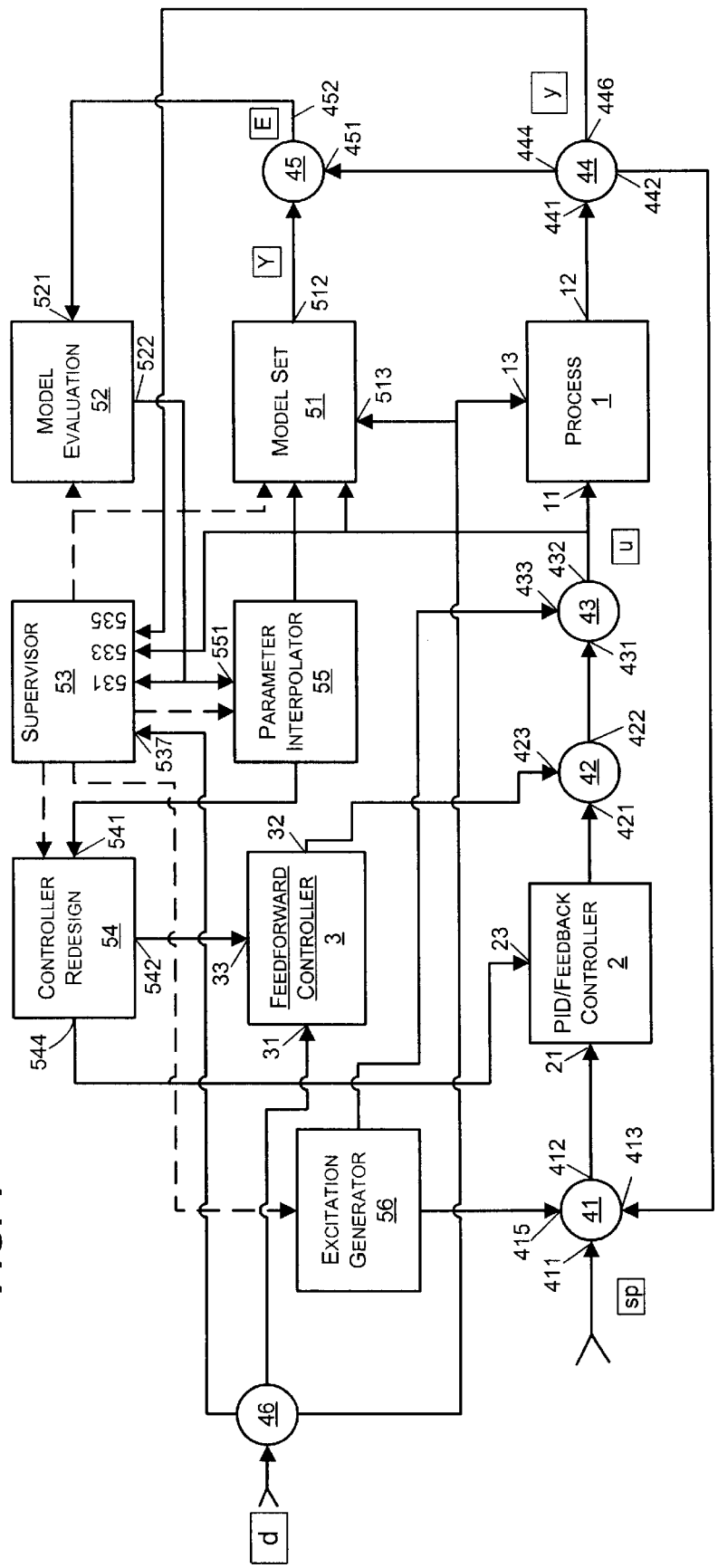
FIG. 1 is a functional block diagram of an Adaptive Feedback/Feedforward PID Controller, the operation which is based on interpolation of process model parameters.

Referring now to FIG. 1, depicted therein is an adaptive feedback/feedforward (FB/FC) PID controller used to control a process 1. The general operation of such systems is well known by those skilled in the art. See, for example, F. G. Shinskey, *Process Control Systems: Application, Design and Tuning*, 4$^{th}$ ed., McGraw-Hill, New York, 1996. The adaptive control system illustrated in FIG. 1 includes both a feedback controller, in the form of PID controller 2, and a feedforward controller 3.

The process control system may be conveniently described with reference to a feedback controller (FBC) input node 41, an FBC output node 42, a process input node 43, a process output node 44, a feedforward controller (FFC) input node 46, and an error node 45. In a manner familiar to those skilled in the art, a process setpoint signal, SP, is applied to a first input of input node 41. The output 412 of input node 41 is coupled to input 21 of PID controller 2. The output 22 of PID controller 2 is coupled to a first input 421 of FBC output node 42. The output 422 of node 42 is coupled to a first input 431 of process input node 43. Output 432 of node 43 is coupled to a first input 11 of process 1. The output 12 of process 1 is coupled to an input 441, of a process output node 44. A first output 442 of node 44 is fed back to a second input 413 of input node 41. A second output 444 of node 42 is coupled to a first input 451 of error node 45. As may be seen in FIG. 1, the input signal to process 1 will, for the purpose of this Description, be referred to as u(t), and the output signal of process 1 will be referred to as y(t). (Strictly speaking, u(t) and y(t) are electrical representations of the physical phenomena that arise in connection with the process.) In addition, a disturbance signal, d, appears at input of 461 of FFC input node 46. The disturbance signal d is coupled from a first output 462 of node 46 to an input 31 of FFC 3 and propagates from a second output 454 of node 45 to process 1.

Insofar as described above, the feedback/feedforward PIC process control system assumes a form conventionally encountered by artisans involved in the design and operation of such systems. The additional functional components illustrated in FIG. 1 constitute the salient aspects of the subject invention.

Specifically, a model set component 51 is shown in FIG. 1 to have signal inputs 511 and 513 respectively coupled to the disturbance signal d and to process input signal u(t). The constituents of model set component 51 are a set mathematical models of process 1. The output 512 of component 51 is coupled to input 453 of error node 45. Output 452 of node 45 is coupled to input 521 of model evaluation component 52. The model evaluation component includes a simulator that simulates the process, as defined by the process parameter values delivered by model set component 51. In a preferred embodiment, simulation is achieved through software techniques. Output 522 of model evaluation component 52 is coupled to input 551 of parameter interpolator component 55 and to input 531 of supervisor component 53. Output 552 of parameter interpolator 55 is coupled to input 515 of model set component 51, and output 554 of parameter interpolator 55 is coupled to the input 541 of controller redesign component 54. Controller redesign component 54 has a first output 542 coupled to an input 23 of FBC 2 and a second output 544 coupled to input 33 of FFC 3. A description of the operation and significance of components 51, 52, 53, 54, and 55 follows.

Operation of the Adaptive Feedback/Feedforward PID Controller, including particularly components 51, 52, 53, 54 and 55, proceeds generally as follows. The adaptive feedback/feedforward PID control system is mathematically described by a model set 51. Each model in model set 51 is defined by predetermined parameters, and each of the models is intended to replicate, in a limited fashion, process 1. In general, each of the models may be defined by a number of parameters, m, and each of the parameters may be assigned a number of values, n. Therefore the total number of models in set 51 is equal to N, where N=m$^n$. In an exemplary embodiment of the invention, the models are characterized by the parameters DT (Dead Time), Tc (Time Constant) and Gain. Furthermore, each of the parameters will be assumed to have been assigned one of three values: Dead Time=DT+, DT, DT−; Time Constant=Tc+, Tc, or Tc−; and Gain=Gain+, Gain, and Gain−. Therefore, in this exemplary Description the total number of models available to mathematically approximate process 1 is N=3$^3$=27. Each of the models will be referred to as Modi, where i=1, . . . ,27.

At, or prior to, the initiation of a model evaluation scan, parameter interpolator 55 provides a set of predetermined initialization parameter values to model set component 51. Again, if three parameters, DT, Tc and Gain are assumed, and if each of the parameters has three predetermined initialization parameter values, then parameter interpolator 55 will provide nine parameter values to model set component 51. The manner in which parameter values are established will be in the discretion of the controller design. In general, the parameter values written to model set 51 at the beginning of an adaptation cycle are based on the adaptive parameter values that were computed in the course of the most recent adaptation cycle. In response to the nine parameter values, and under the control of supervisor 53, the model set component constructs a total of 27 models, Mods, where I=1 . . . ,27. In the course of a model evaluation scan, supervisor 53 will sequentially select and activates a model Mod$_i$;. At that time the process input u(t) that appears at input 511 of the model set will be applied to the input of the activated model. The resultant output of Mod$_i$ will then appear at model set output 512.

The output 512 of model set 51 is coupled to an input 451 of error generator node 45. The output signal of set 51 is identified by the variable Y. Concurrently, output, y, of process 1 is coupled to a second input 453 of the error generator mode 45. The output 52 of node 45, error signal E, is coupled to an input 521 of a models evaluation component 52. The error signal Ei (t) is the difference between the process output y(t) and the output of model Mod$_i$ at time t. In a manner to be fully explained below, models evaluation component 52 computes a model squared error corresponding to each model Mod$_i$ and assigns the model squared error to parameter values represented in the Mod$_i$. Output 522 of models evaluator 52 is applied to input 551 of parameter interpolator 55. In a manner to be fully described below, parameter interpolator 55 calculates an adaptive parameter value for parameters represented in a model. Output 552 of parameter interpolator 55 is coupled to model set 51, and output 553 of parameter interpolator 55 is coupled to input 541 of controller redesign component 54. Output 544 is applied to PID controller 2 and output 542 to feedforward controller 3. In a manner to be fully explained below, controller redesign component 54 imparts adaptive parameter values to the controllers upon conclusion of an adaptation cycle. The invention is also shown in FIG. 1 to include an excitation generator component 56 having an output 562 coupled to input 415 of input node 41.

A supervisor component 53 has signal inputs 533, 535, 537 respectively coupled to the process input signal u, to the process output signal y, and to the disturbance signal d. Supervisor component 53 also has an input 534 coupled to the output of model evaluation component 52. Supervisor 53 has a first control output 535 coupled to models interpolator component 55, a second control output coupled to models evaluation component 52, and a third control output coupled to controller redesign component 54. In addition to performing other functions, supervisor component 53, operates to detect changes in the process output y, changes in the process input u from PID controller 2, and changes in the disturbance (feedforward) input d. In the event that a change in the level of any of these signals exceed a predetermined minimum or threshold level, supervisor 53 initiates an adaptation cycle. Model evaluation, as described herein below, comprises the following steps:

(1) Model initiation and adjustment of model output to current process output.

(2) Incremental update of model based on specifications in the u and/or d signal.

(3) Computation of model squared error.

Specifically, the process of adaptation of the feedback/feedforward PID is based on the application of interpolative techniques to model parameter values. The concept of model squared error is central to this technique. With respect to the subject invention, model squared error, E$_i$, (t), is defined, for each model in a scan, by the equation:

$$Ei(t)=(y(t)-Yi(t))^2 \qquad \text{[Equation 1]}$$

where:

y(t) is the process output at the time t,

Yi(t) is the output of model Mod$_i$ at time t,

E$_i$(t) is the squared error attributed to Mod$_i$, and

E(t)=[E$_i$(t), . . . ,Ei(t), . . . ,En(t)] is the squared error vector for Mod$_i$, where i−1, . . . , N at time t.

The model squared error E$_i$(t) is assigned to every parameter value of the model Mod$_i$, provided that the parameter value is represented in the evaluated Modi;. If a specific parameter value is not represented in the evaluated model, the parameter value has assigned zero. Next, the Mod$_i$+1 is evaluated, and again the model squared error is computed for that model. The computed model squared error is assigned to every parameter value of the Mod$_i$. As E$_i$(t) is calculated during each model evaluation, and assigned to the parameter values represented in the respective models, an accumulated total of assigned model squared errors is maintained for each parameter value. The process continues, until all models, i=1, . . . , N, are evaluated. A complete sequence, where each model Mod$_i$ is evaluated once, and a corresponding model squared error, E$_i$(t), is calculated, is referred to as a model scan. As a result of this sequence of evaluations, or model scan, each parameter value has assigned a sum of squared errors from all models in which this specific parameter value has been used. Therefore, as a result of every model scan, each parameter value, P$^{kl}$, where k=1, . . . , m and l=1, . . . ,n will be assigned a Norm:

$$Ep^{kl}(t) = \sum_{i=1}^{N} X_{kl}E_i(t), \qquad \text{[Equation 2]}$$

where:

Ep$^{kl}$(t) is the Norm assigned to the parameter value p$^{kl}$ as a result of scan t, N is the total number of models, and X$_{kl}$=1 if parameter value p$^{kl}$ is used in the Mod$_i$, and X$_{kl}$=0, if parameter value p$^{kl}$ is not used in the Mod$_i$.

The process is repeated in the next scan and the Norm that results from sum of the squared errors assigned during that scan is added to the Norm's computed during the prior scan(s). The set of successive performances of model scans is referred to as an adaptation cycle and continues, under control of supervisor 53, until predetermined number of scans are completed, or until there have occurred an adequate number of excitations at the process input, whichever condition is satisfied first.

As a result of this procedure, every parameter value $p^{kl}$ has assigned an accumulated value of the Norm determined during an adaptation cycle:

$$sumEp^{kl} = \sum_{i=1}^{M} Ep^{kl}(t).\qquad\text{[Equation 3]}$$

At the end of the adaptation cycle, the inverse of the sum is calculated for every parameter value $p^{kl}$:

$$Fkl=1/sumEp^{kl}.\qquad\text{[Equation 4]}$$

Inasmuch as Fkl is the inverse of the sum of the model squared errors, the variable Fkl may be intuitively seen as a measure of the Fitness of the parameter value. Then, for every parameter $p^k$, there is calculated an adaptive parameter value $P^k(a)$ that is a weighted average of all values of this parameter:

$$p^k(a)=p^{kl}*fk1+ \ldots +p^{kl}*fkl+ \ldots +p^{kn}*fkn,\qquad\text{[Equation 5]}$$

where:

$$\text{relative fitness } fkl=Fkl/sumFK,\qquad\text{[Equation 6]}$$

and $$sumFK=Fkl+ \ldots +Fkl+ \ldots +Fkn\qquad\text{[Equation 7]}$$

Accordingly, each factor fkl may be viewed as a corresponding to Normalized Fitness for the respective parameter value.

The adaptive parameter values, as calculated above, define a new model set, with center parameter values $p^k(a)$, k=1 . . . m, and range of parameter values between upper and lower bounds, to be assumed in the design. The range of changes defined as $+\Delta$ % to $-\Delta$ %, and should be represented by two or more additional parameter values. In other words, if the an adaptation cycle yields an adaptive parameter value $p^k(a)$, then it is necessary to define at least two additional parameters that assume the respective values, $p^k(a)[1+\Delta \%]$, and the value, $p^k(a)[1-\Delta \%]$, for the new model evaluation. Accordingly, each parameter has defined lower and upper bounds for adaptation. If $p^k(a)$ exceeds a bound value, it is limited at the bound value. As soon as model has been updated, that is, upon completion of an adaptation cycle, controller redesign takes place based on updated $p^k(a)$, k=1, . . . m model parameter values. Adaptation may be applied to the entire model or may be limited to the feedback or feedforward part of the model, exactly of that part which relates output with inputs where required minimum excitation level exists. In addition, external excitations may be injected into feedback loop, in those situations where inadequate excitation otherwise fails to be delivered to the control system. Such excitations are delivered by Excitation Generator 56, under the control of Supervisor 53.

Figure 2:
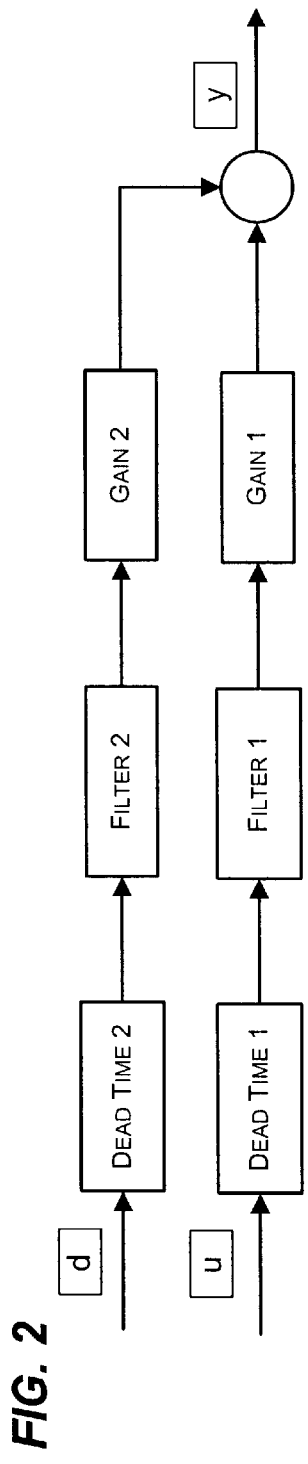
FIG. 2 is a conceptual depiction of a first-order-plus-deadtime process model that includes both feedback/feedforward loops.

In order to better understand the adaptive parameter interpolation procedure, consider an example of the first order plus dead time process model, both for the feedback and feedforward loops. The process model is represented by FIG. 2.

Figure 3:
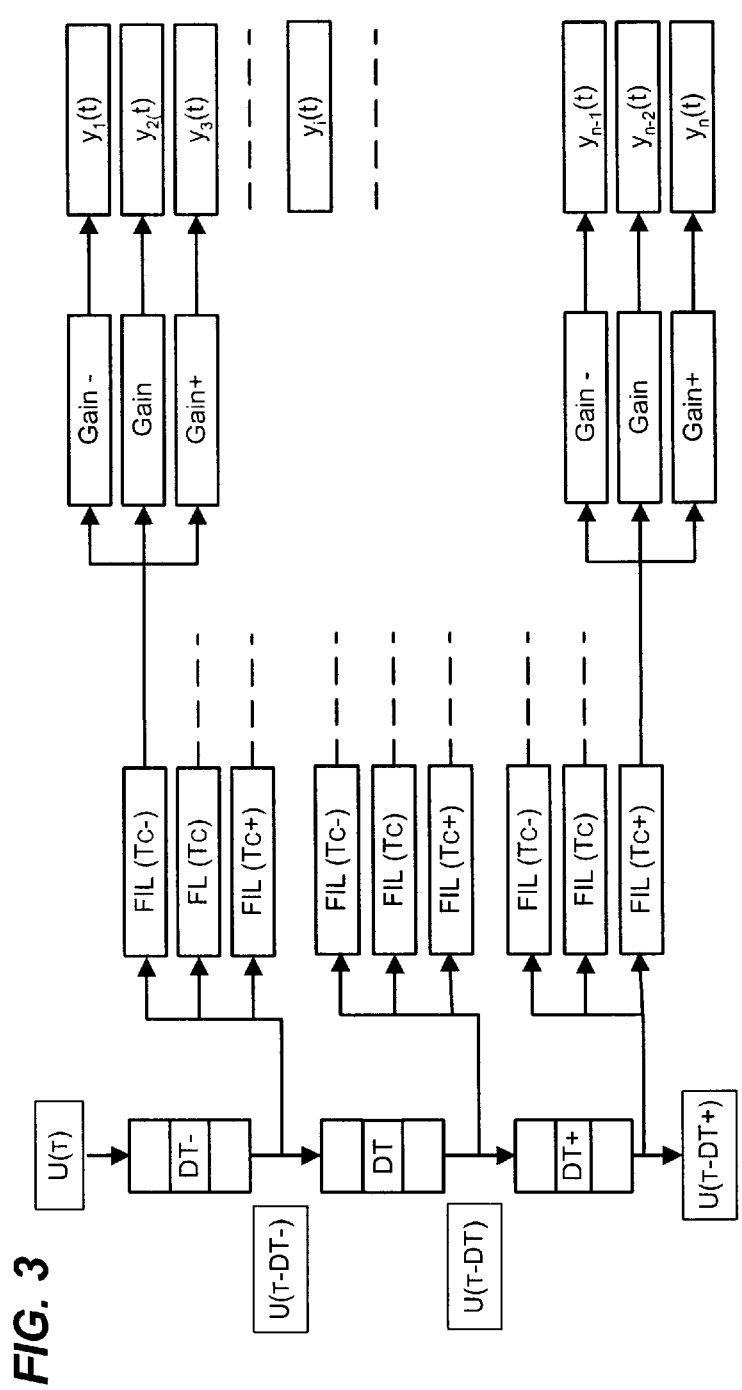
FIG. 3 is a depiction of a model set characterized by three parameters, DT, Tc and Gain, each of which may assume one of three values.

Assume that we use three values are used for every parameter and adaptation range is $(+\Delta \%)$ to $(-\Delta \%)$ in one cycle. Then for every process input u(t) and disturbance d there is encountered the model set depicted in FIG. 3. In FIG. 3:

(DT) is the central value of the Dead Time parameter;
(DT−) is (DT−$\Delta$ %);
(DT+) is (DT+$\Delta$ %);
($T_c$) is the central value of the Time Constant parameter;
($T_c$−) is ($T_c$−$\Delta$ %);
($T_c$+) is ($T_c$+$\Delta$ %);
Gain is the central value of the Gain parameter;
(Gain−) is (Gain−$\Delta$ %); and
(Gain+) is (Gain+$\Delta$ %).

The number of switching combinations resulting from the configuration of FIG. 3 is 3×3×3=27. However, if both inputs in the model of FIG. 2 are used for adaptation, the number of switching combinations increases to $27^2$=729. This is a significant number of model combinations. Nevertheless, when compared to existing model-switching strategies, it must be emphasized that the inventive technique described here requires only three values for each parameter. This benefit derives primarily from the fact that controller adaptation is driven by parameter evaluation, rather than model evaluation. Therefore, it is necessary to perform adaptation based on nine parameter values in the feedback loop and nine parameter values in the feedforward loop. Consequently, the number of evaluated parameters varies merely proportionally to the number of parameters. Consequently, the number of evaluated parameters varies exponentially with the number of parameters under a model evaluation technique.

The sequence with which parameter values are imparted to the model is significant in limiting computational requirements. In general, a parameter with memory, such as Dead Time, should be imparted first, and a memoryless parameter, such as Gain, last. Accordingly, a preferred sequence is Dead Time, Time Constant, then Gain. This suggested sequence is graphically represented in FIG. 3.

After comparing every model output with current process output, the tables of sum of squared errors is built. After adaptation cycle has been completed, an adaptive parameter value for every parameter is calculated, as in Table 1 below:

TABLE 1

| Parameter | Parameter Value | Squared Error (SE) | Inverse SE | Adaptive Parameter Value |
|---|---|---|---|---|
| Dead Time | DT−, DT, DT+ | Eqs. (1), (2), (3) | Eqs. (6), (7) | Eq. (5) |
| Lag | $T_c$−, $T_c$, $T_c$+ | | | |
| Gain | Gain−, Gain, Gain+ | | | |

First-order Plus Dead Time Adaptive Process Model Interpolation

Once a model adaptation cycle has been completed, and adaptive parameter values established in accordance with the above, controller redesign is effected through the operation of controller redesign component 54. In essence, the controller redesign component simply maps the newly calculated, adaptive process parameter values to redesigned values for the parameters that characterize FBC 2 and/or to FFC 3. For example, in a manner well known to control system designers, the process parameters DT, $T_c$ and Gain are mapped into controller parameters Reset, Rate and Gain. Since a complete first order plus dead time process model is used, any tuning rules can be applied, including Lambda or IMC tuning. For the feedforward path, the entire dynamic feedforward controller design Equation has been shown to be applicable:

$$G_{\!f\!f} = -\frac{Kd}{Ku}\frac{1+sTu}{1+sTd}, \qquad \text{[Equation 8]}$$

where:
 $G_{\!f\!f}$=Feedforward Controller transfer function,
 Kd=Static Gain of the feedforward process dynamics,
 Ku=Static Gain of the feedback process dynamics,
 Td=Time Constant of the feedforward process dynamics, and
 Tu=Time Constant of the feedback process dynamics.

In summary, the adaptive FB/FC controller that has been described above represents a substantial enhancement of auto-tuning techniques in a scalable process control system. Although the invention has been described with reference to the specific exemplary embodiments intended to instruct and illustrate the invention, the inventive Adaptive Feedback/Feedforward Controller is not limited to those embodiments. Various modifications, improvements and additions may be implemented by those with shall in the art, and such modifications, improvements, and additions will not depart from the scope of the invention, as defined by the appended Claims. For example, as described above, controller adaptation is predicated on statistical interpolation of parameters used to construct a mathematical model of the process under control. Although the process is characterized by three parameters, DT, $T_c$ and Gain, and each of those parameters is assigned three values, the invention clearly extends to other, or a different number of, parameters, with a different number of assigned values. In addition, model evaluation and parameter interpolation are illustrated as implemented primarily with functional components denominated model set 51, models evaluator 52, supervisor 53, parameter interpolator 55, and controller redesign 54. Those skilled in the art will understand that the partitioning of inventive functions among the denominated components is discretionary to those responsible for controller implementation and operation. Similarly, the functions of the invention are susceptible to implementation by either hardware or software, or a combination of the two. Variations of that nature are to be deemed equivalent. However, it is recognized that such specific approaches represent but an insubstantial deviation from the embodiments of the invention described above. Consequently, the Claims below are properly construed to embrace all modifications, variations and improvements that fall within the true spirit and scope of the invention, as well as substantial equivalents thereof. Accordingly, other embodiments of the invention, though not described with particularly herein, are nonetheless comprehended with the scope of the invention, as defined by the Claims below.

What is claimed is:

1. In a process control system, a method of adaptive controller design comprising the steps:
 (a) compiling a model set for the process, wherein each of the models is characterized by a plurality of parameters and in each model each of the parameters has a respective value selected from a set of predetermined initialization values;
 (b) evaluating each of the models, whereby a model squared error is computed in the course of the evaluation of each of the models;
 (c) assigning a norm to each parameter value represented in the models, wherein the norm is characterized by:

$$Ep^{kl}(t) = \sum_{i=1}^{N} X_{kl}E_i(t),$$

where:
 $Ep^{kl}$ (t) is the norm assigned to the parameter value, $p^{kl}$, as a result of scan t,
 N is the total number of models, and
 $X_{kl}$=1 if a parameter value, $p^{kl}$, is used in one of the models, $Mod_i$, and
 $X_{kl}$=0 if a parameter value, $p^{kl}$, is not used in one of the models, $Mod_i$; and
 (d) for each parameter, calculating an adaptive parameter value that is weighted average of values included in the set of predetermined initialization values; and
 (e) redesigning the controller in response to the adaptive parameter values.

2. A method of adaptive controller design as defined in claim 1, wherein the set of initialization values associated with each of the parameters includes a center parameter value, an upper bound parameter value, and a lower bound parameter value.

3. A method of adaptive controller design as defined in claim 2, wherein the upper bound parameter value is offset from the center parameter value by +Δ % and the lower bound parameter value is offset from the center parameter value by -Δ %.

4. A method of adaptive controller design as defined in claim 2, wherein each of the models, $Mod_i$, is evaluated by comparing a process output at a given time, y(t), with a model output at that time, $Y_i(t)$, and by computing a respective model squared error, $E_i(t)=(y(t)-Y_i(t))^2$ and a norm for every parameter of the models $Mod_i$.

5. A method of adaptive controller design as defined in claim 1, wherein (i) a first evaluation scan is performed of a first model set and wherein in the course of the first evaluation scan each of the models is evaluated based on the difference between an instantaneous process output and a model output during the first evaluation scan and a first norm is computed for each of the parameter values represented in the models evaluated in the first evaluation scan and wherein (ii) a second evaluation scan is performed of the first model set wherein in the course of the second evaluation scan each of the models is evaluated based on the difference between the instantaneous process output and the model output during the second evaluation scan and a second norm is computed for each of the parameter values represented in the models evaluated in the second evaluation scan, and wherein (iii) the second norm for each parameter value is added to the first norm for each parameter value to formulate an aggregate norm for the respective parameter values, and wherein (iv) additional evaluation scans are performed to complete an adaptation cycle and in the course of each additional evaluation scan a respective norm for each parameter is computed and that norm is added to the then existing aggregate norm for the respective parameter value to form a current aggregate norm for the respective parameter value, resulting; in a final Norm upon completion of the evaluation scans constituting the adaptation cycle, and wherein (v) an adaptive parameter value for each parameter is computed as a sum of weighted predetermined initialization values associated with the respective parameter, where each adaptive parameter value is weighted by a respective weighting factor and the weighting factor for a parameter value is the sum of the aggregate norms for all values of the parameter divided by the aggregate norm computed for the respective parameter value.

6. A method of adaptive controller design as defined in claim 1, wherein a model squared error, $E_i(t)$, is computed as $E_i(t)=(y(t)-Y_i(t))^2$, where y(t) is a process output at a particular time and $Y_i(t)$ is a model output at that time.

7. A method of adaptive controller design as defined in claim 1, wherein the adaptive parameter value for a parameter consists of a sum of weighted parameter values, where a weighting factor applied to each parameter value is proportional to a parameter fitness.

8. A method of adaptive controller design as defined in claim 7, wherein the adaptive parameter value for a parameter is computed as a sum of weighted values of the parameter, where the weighting factor applied to each value of the parameter is proportional to the parameter fitness.

9. A method of adaptive controller design as defined in claim 8, wherein a norm is assigned to each model parameter value represented in a model, wherein the norm is the sum of the model squared errors that are computed in the course of the evaluation of each of the models.

10. A method of adaptive controller design as defined in claim 9, wherein a model squared error, $E_i(t)$, is computed as $E_i(t)=(y(t)-Y_i(t))^2$, where y(t) is a process output at a particular time and $Y_i(t)$ is a model output at that time.

11. A method of adaptive controller design as defined in claim 1, wherein the parameters of the process models include a memory parameter, and a memoryless parameter, and wherein a process modeling sequence accounts for the memory parameter first and the memoryless parameter next.

12. A method of adaptive controller design as defined in claim 11, wherein the set of initialization values associated with each of the parameters includes a center parameter value, an upper bound parameter value, and a lower bound parameter value.

13. A method of adaptive controller design as defined in claim 12, wherein the upper bound parameter value is offset from the center parameter value by $+\Delta$ % and the lower bound parameter value is offset from the center parameter value by $-\Delta$ %.

14. A method of adaptive controller design as defined in claim 11, wherein each of the models, $Mod_i$, is evaluated by comparing a process output at a given time, y(t), with a model output at that time, $Y_i(t)$, and by computing a respective model squared error, $E_i(t)=(y(t)-Y_i(t))^2$ for the models, $Mod_i$.

15. A method of adaptive controller design as defined in claim 11, wherein a norm is assigned to each model parameter value represented in a model, wherein the norm is the sum of the model squared errors that are computed in the course of the evaluation of each of the models.

16. A method of adaptive controller design as defined in claim 11, wherein a model squared error, $E_i(t)$, is computed as $E_i(t)=(y(t)-Y_i(t))^2$, where y(t) is a process output at a particular time and $Y_i(t)$ is a model output at that time.

17. A method of adaptive controller design as defined in claim 11, wherein the adaptive parameter value for a parameter is comprised as a sum of weighted parameter values, where a weighting factor applied to each parameter value is proportional to a relative fitness of the parameter value.

18. A method of adaptive controller design as defined in claim 17, wherein the adaptive parameter value for a parameter is computed as a sum of weighted values of the parameter, where the weighting factor applied to each value of the parameter is proportional to the parameter fitness.

19. A method of adaptive controller design as defined in claim 1, wherein the controller is a PID type controller.

20. A method of adaptive controller design as defined in claim 1, wherein the controller includes one or more feed forward inputs.

21. A method of adaptive controller design as defined in claim 1, wherein the controller is a multi-input, multi-output controller.

22. A method of adaptive controller design as defined in claim 1, wherein the controller is a model predictive controller.

* * * * *

UNITED STATES PATENT AND TRADEMARK OFFICE
CERTIFICATE OF CORRECTION

PATENT NO. : 6,577,908 B1  Page 1 of 1
DATED : June 10, 2003
INVENTOR(S) : Wilhelm K. Wojsznis et al.

It is certified that error appears in the above-identified patent and that said Letters Patent is hereby corrected as shown below:

Column 7,
Line 40, please delete "52" and insert -- 452 --.

Column 9,
Line 25, please delete "$P^K(a)$" and insert -- $p^{K(a)}$ --.

Signed and Sealed this

Twentieth Day of January, 2004

JON W. DUDAS
*Acting Director of the United States Patent and Trademark Office*